United States Patent [19]

Walter et al.

[11] 4,373,599
[45] Feb. 15, 1983

[54] HYDRAULIC RACK STEERING SYSTEM

[75] Inventors: Wolfgang Walter; Werner Breitweg, both of Schwabisch Gmund, Fed. Rep. of Germany

[73] Assignee: Zahnradfabrik Friedrichshafen, AG., Friedrichshafen, Fed. Rep. of Germany

[21] Appl. No.: 240,214

[22] Filed: Mar. 3, 1981

[30] Foreign Application Priority Data

Mar. 8, 1980 [DE] Fed. Rep. of Germany ....... 3009051

[51] Int. Cl.³ .......................... B62D 5/10; F16J 15/18
[52] U.S. Cl. ..................................... 180/148; 92/167; 92/168; 92/169; 277/152; 277/166; 277/188 R
[58] Field of Search .................. 180/148; 92/167, 168, 92/169; 277/152, 165, 166, 188 R, 188 A, 189

[56] References Cited

U.S. PATENT DOCUMENTS

| 3,528,346 | 4/1969 | Lee | 92/165 R |
| 3,817,155 | 6/1974 | Walter | 92/167 |
| 3,860,250 | 1/1975 | Lundquist | 277/165 |
| 4,063,490 | 12/1977 | Duffy | 92/167 |
| 4,179,131 | 12/1979 | Nussbaumer | 92/168 |
| 4,211,152 | 7/1980 | Colletti et al. | 92/168 |
| 4,301,691 | 11/1981 | Walter | 180/148 |

FOREIGN PATENT DOCUMENTS 2406566  6/1979  Fed. Rep. of Germany .

Primary Examiner—Joseph F. Peters, Jr.
Assistant Examiner—Donn McGiehan
Attorney, Agent, or Firm—Zalkind & Shuster

[57] ABSTRACT

A hydraulic rack steering system is provided with a unitary seal assembly around a piston rod which is a composite of compressible toroidal gaskets having an intermediate pre-stressing ring constructed and arranged to radially stress a plastic sealing ring against a piston rod. Thus, there is a sliding sealed relationship established between the piston rod and a composite sealing assembly secured within the servocylinder. The composite sealing ring assembly is carried in an assembly housing with the components locked in place therein by a closure ring press fitted into the housing. The cover ring is spaced from the composite sealing members in order to permit clearance for the piston rod to follow bending of a rack with which the piston rod is integral and wherein the rack is subjected to bending effected by steering stress.

5 Claims, 3 Drawing Figures

HYDRAULIC RACK STEERING SYSTEM

STATUS OF THE PRIOR ART

Figure 3:
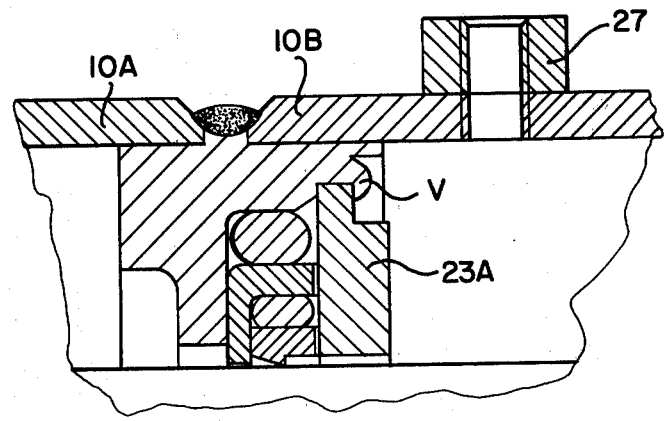

Hydraulic rack steering systems having sealing arrangements between piston rods and servocylinders are known, for example, as shown in German patent No. 24 06 566, particularly FIG. 3. The arrangement shown therein comprises a commercially available shaft sealing ring fixed in a retaining ring or assembly housing and secured within a servocylinder, and has an inner sealing ring slidably engaging a piston rod of a servomotor. The sealing ring is of a rubber-like material loaded by working pressure with a sealing lip radially forced into engagement with the piston rod by such pressure as well as by an annular spring. Such an arrangement causes heavy wear due to high friction. Further, such arrangements have only a limited ability to absorb radial movements or bending of the rack. Deviations of the piston rod from true center in the servocylinder must be avoided since side loading of the sealing lip causes it to stick or jam causing jerky motion. Moreover, the construction shown is not suitable for relatively high pressures, such as above 100 bar.

The U.S. patent to Wolfgang Walter, U.S. Pat. No. 3,817,155 of June 18, 1974 German No. 21 59 487) shows in FIG. 2 a piston sealing assembly in a hydraulic rack steering system which is limited to use on a piston rod. As seen in FIG. 3 of this patent, a seal assembly is disclosed in a retaining ring force fitted on the open end of an inner sleeve carried within the servomotor cylinder and secured at its other end to the steering transmission housing. The inner sleeve and seal assembly are spaced from the walls of the servocylinder to have a certain amount of radial flexibility. However, the seal assembly itself must not absorb radial movement of the piston rod and must therefore be construced with substantial radial rigidity.

BRIEF DESCRIPTION OF THE INVENTION

The construction of the invention permits a preassembly of sealing components which can be inserted deeply within a servocylinder and yet at the same time permit all necessary radial flexibility of the piston rod. Inasmuch as the pinion driven rack and the piston rod are essentially an integral bar, bending of the rack with steering stresses can cause radial movement of the piston rod and allowance for that must be made. This is afforded by a construction wherein a composite assembly of sealing members may be made in a single unit but in a manner such that spacing between the seal housing and closure ring of the housing is provided. Further, the innermost sealing element is of high wear resistant plastic having a lip radially pressed in smooth sliding engagement with the piston rod, a certain degree of radial prestress being provided for the innermost ring in order to achieve that effect. The construction affords a unitary seal assembly useable for pressures above 100 bar and having high stability.

Figure 1:
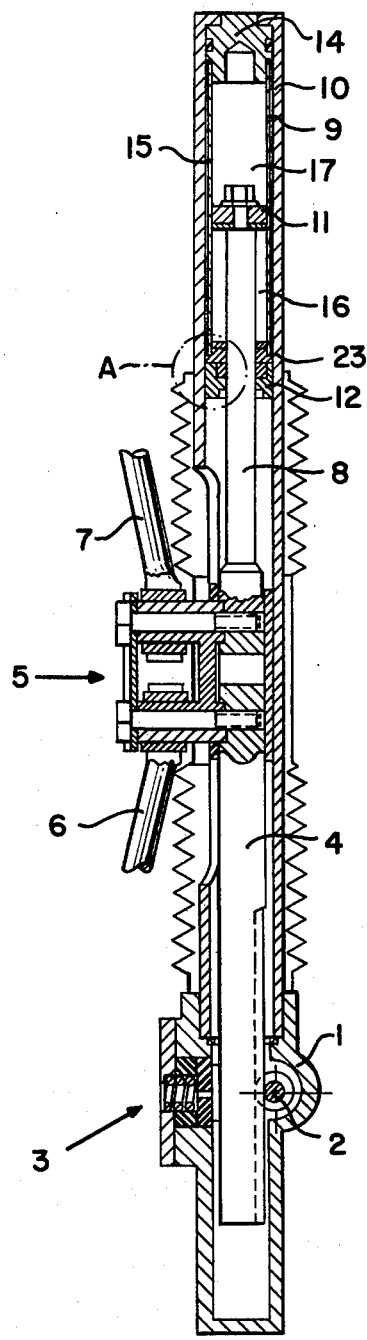

A detailed description of the invention now follows in conjuction with the appended drawing, in which FIG. 1 illustrates the overall arrangement of a rack steering gear of the type having a coaxial rack and piston rod within a steering transmission casing which includes a pinion mount and a servocylinder and showing the position of the particularly improved seal assembly of the invention at one end of the servocylinder.

Figure 2:
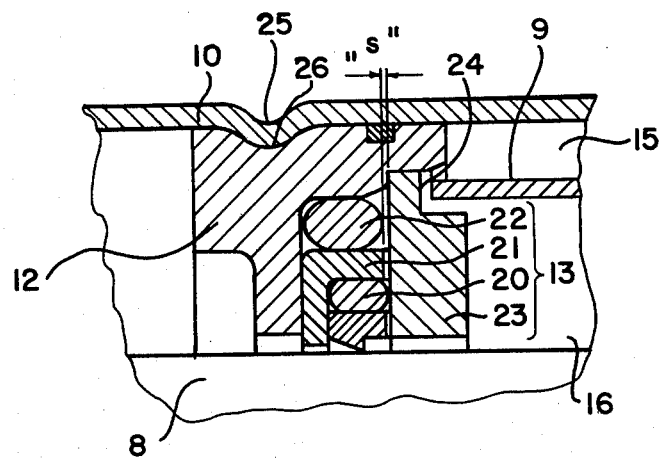

FIG. 2 shows a cross section in detail of a particular components of the seal assembly as incorporated within a servocylinder and FIG. 3 is a cross section of a modification of the seal assembly.

Referring to the drawing, a rack 4 driven by pinion 2 and having radial support block 3 is slidably carried in a steering transmission casing 1 of a hydraulic rack booster steering system. It will be understood that pinion 2 is rotated by a steering spindle (not shown) to actuate the rack. Rack 4 has a rod connecting assembly 5 to which connecting rods 6 and 7 are articulated all as understood for connection at their outer ends to steering linkages of a vehicle wheel.

Extending axially of rack 4 is a piston rod 8 carrying a piston 11 reciprocal in a servocylinder 10. The servocylinder is closed at one end by a seal asssembly shown in detail in FIG. 2 and carried in a retaining ring or seal assembly housing 12 fixed in the servocylinder. The other end of the servocylinder is closed by an end cap 14. It will thus be understood that the piston reciprocates between pressure chambers afforded in an inner sleeve 9 within casing 1 fixedly secured therein and radially spaced so as to provide an annular oil duct 15 for the pressure chamber 16.

A plurality of members designated by reference numeral 13 and carried within assembly housing 12, namely the two ring rod seal 20, the outer ring being a compressible toroidal gasket or sealing ring and the inner ring being of wear resistant plastic having a lip, as shown, sealingly engaging piston rod 8. The plastic ring is the innermost ring of the composite rings and is made of a wear resistant plastic such as Teflon. The seal assembly further comprises a prestress ring of L-section 21 having a peripheral wall effecting a collar and a radial wall, as shown, wherein the collar is intermediate the rod seal 20 and a compressed toroidal gasket or sealing ring 22. Thus, seal assembly housing 12 effects a collar in which the several seal members are carried.

An assembly closure ring 23 is press fitted within the collar of assembly housing 12 and is also axially secured by the end of the inner sleeve 9. Closure ring 23 is grooved, e.g., at 24 to permit access of oil from duct 15 through the conically shaped channel formed in the edge of the collar in assembly housing 12, to pressure chamber 16.

The collar of ring 21 is a prestress ring for a radial force exerted against it by the gasket 22 to exert a prestress force on the composite rod seal 20. The lip of the Teflon member of the rod seal is thus stressed radially against the piston rod 8 in smooth sliding contact. The seal assembly housing 12 is secured in the servocylinder 10 by means of a peripheral crimp 25 in a servocylinder engaged in a groove 26 of the seal assembly housing, as will be apparent from FIG. 2.

The seal assembly 13 has a construction which enables piston rod 8 to move in accordance with bending of rack 4 when the rack is laterally loaded as by steering stresses and is experiencing radial oscillation. The construction of the seal assembly on the piston rod precludes risk of oil leakage. In order to permit movement of piston rod 8 to follow the bending of rack 4, a suitable axial clearance "S" is between the prestress ring 21, and assembly cover ring 23.

While it is contemplated that the seal assembly will be made as a composite unit of all of the aforementioned elements which can be inserted deeply in a servocylinder, it will be appreciated that assembly can also be made by means of suitable tools directly in the servocylinder 10.

Referring now to FIG. 3, the seal assembly is substantially the same as that described, except that the servocylinder consists of sections 10A and 10B joined by a weld which also makes those sections integral with an assembly housing 12A having an upstanding rib fitting between the opposed ends of the servocylinder sections.

In such construction, no inner sleeve 9 is used, and the open end of assembly housing 12A is peened over at "V" to secure the cover ring 23A in spaced relation to afford a clearance such as "S", as seen in FIG. 2, effected by a shoulder in assembly housing 12A abutted by cover ring 23A, as is apparent from FIG. 3. A collar effecting a port 27 connects to section 10B for oil flow.

What is claimed is:

1. A hydraulic rack steering system having a servocylinder with a piston rod therein and being integrally connected to a rack with a pinion for driving the rack wherein said servocylinder comprises pressure chambers with a piston carried on said rod between said pressure chambers and including a seal assembly secured at an end of the servocylinder slidably engaging the piston rod;

the improvement wherein:
   the seal assembly has a seal assembly housing (12) and within said housing a compressible sealing ring (22) surrounding a prestress ring (21) surrounding a further compressible sealing ring around a sealing ring of plastic material for engagement with a piston rod;
   including a cover ring (23) secured within said seal assembly housing for retaining the aforementioned rings axially therein and being disposed with axial clearance (S) from said prestress ring to permit movement of said piston rod to follow bending of said rack under steering stress.

2. A hydraulic rack steering system as set forth in claim 1,
   including a sleeve (9) in said servocylinder extending to said seal assembly and having an end in retaining abutment with said cover ring (23).

3. A hydraulic rack steering system as set forth in claim 1, said seal assembly housing (12) comprising a collar, said rings being therein and said cover ring being secured by a peened edge of said collar.

4. A hydraulic rack steering system as set forth in claim 2,
   including a duct (15) between said servocylinder and said sleeve for oil flow to a pressure chamber of said servocylinder and means providing flow passage from said duct at an end of said sleeve comprising a groove (24) in said cover ring (23).

5. A hydraulic rack steering system as set forth in claim 3, said servocylinder being in two aligned sections (10A, 10B) spaced by a rib on said seal assembly housing (12A) and a weld joining said sections at their opposed ends and securing said rib therebetween.

* * * * *